(12) United States Patent
Baio et al.

(10) Patent No.: US 11,300,289 B2
(45) Date of Patent: Apr. 12, 2022

(54) RADIANT TUBE RECUPERATIVE BURNER ASSEMBLY

(71) Applicant: ESA S.P.A., Curno (IT)

(72) Inventors: Andrea Baio, Treviolo (IT); Milco Dalfovo, Villa di Serio (IT)

(73) Assignee: ESA S.P.A., Curno (IT)

( * ) Notice: Subject to any disclaimer, the term of this patent is extended or adjusted under 35 U.S.C. 154(b) by 0 days.

(21) Appl. No.: 17/428,675

(22) PCT Filed: Jan. 27, 2020

(86) PCT No.: PCT/IB2020/050603
§ 371 (c)(1),
(2) Date: Aug. 5, 2021

(87) PCT Pub. No.: WO2020/161559
PCT Pub. Date: Aug. 13, 2020

(65) Prior Publication Data
US 2022/0042678 A1   Feb. 10, 2022

(30) Foreign Application Priority Data

Feb. 5, 2019   (IT) .................. 102019000001633

(51) Int. Cl.
| | |
|---|---|
| *F23D 14/12* | (2006.01) |
| *F23L 15/04* | (2006.01) |
| *F23D 14/66* | (2006.01) |
| *F23C 9/00* | (2006.01) |

(52) U.S. Cl.
CPC ............... *F23D 14/12* (2013.01); *F23C 9/00* (2013.01); *F23D 14/66* (2013.01); *F23L 15/04* (2013.01); *F23C 2202/30* (2013.01)

(58) Field of Classification Search
CPC ........ F23C 3/002; F23C 9/00; F23C 2202/30; F23D 14/12; F23D 14/66; F23L 15/04
See application file for complete search history.

(56) References Cited

FOREIGN PATENT DOCUMENTS

| CN | 201582821 U | 9/2010 |
|---|---|---|
| CN | 202350082 U | 7/2012 |
| WO | 2018083559 A1 | 5/2018 |

*Primary Examiner* — Jorge A Pereiro
(74) *Attorney, Agent, or Firm* — Dickinson Wright PLLC; Andrew D. Dorisio

(57) ABSTRACT

A radiant tube recuperative burner assembly having a heat exchanger (13) and a burner (11); said heat exchanger (13) comprises: a first inner tube (15); a second heat exchanger tube (16) coaxial and external to the first tube (15); a third tube (24) coaxial and external to said second tube (16); a fourth tube (35) positioned perpendicular to said first tube (15); a fifth tube (36) coaxial and internal to said fourth tube (35); a flue gas outlet passage (27) positioned inside said fifth tube (36); a first gap (17) between said first tube (15) and said second tube (16); a second gap (25) between said third tube (24) and said second tube (16); a sixth gap (40) between said fourth tube (35) and said fifth tube (36); said first gap (17) communicates with said sixth gap (40); said second gap (25) communicates with said flue gas outlet passage (27); a Venturi tube (41, 52) positioned transverse to said fifth tube (36); the inlet of the Venturi tube (41, 52) communicates with said sixth gap (40); said Venturi tube (41, 52) has an outlet that is in communication with said flue gas outlet passage (27); and with a connection pipe (42) between said heat exchanger (13) and said burner (11).

9 Claims, 5 Drawing Sheets

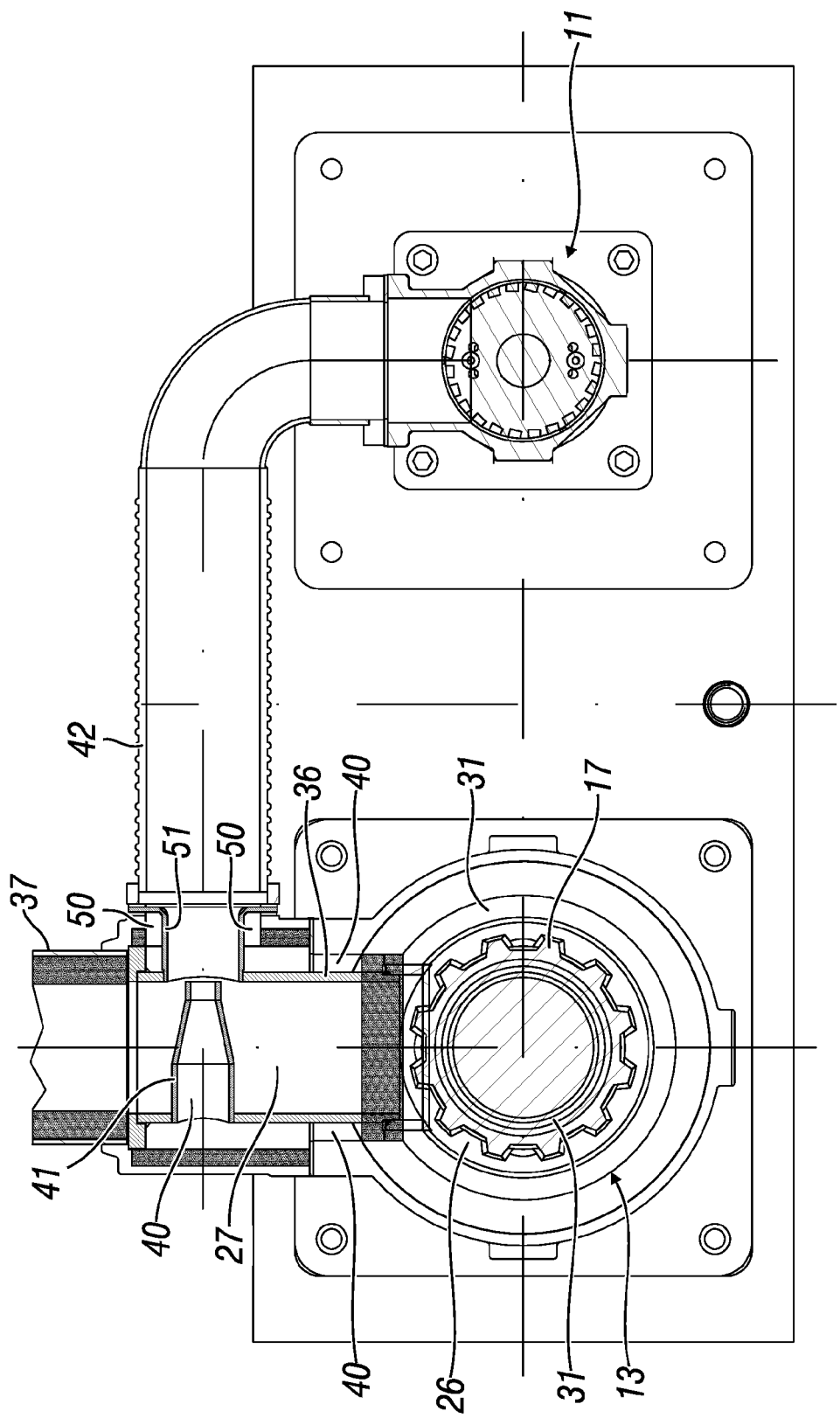

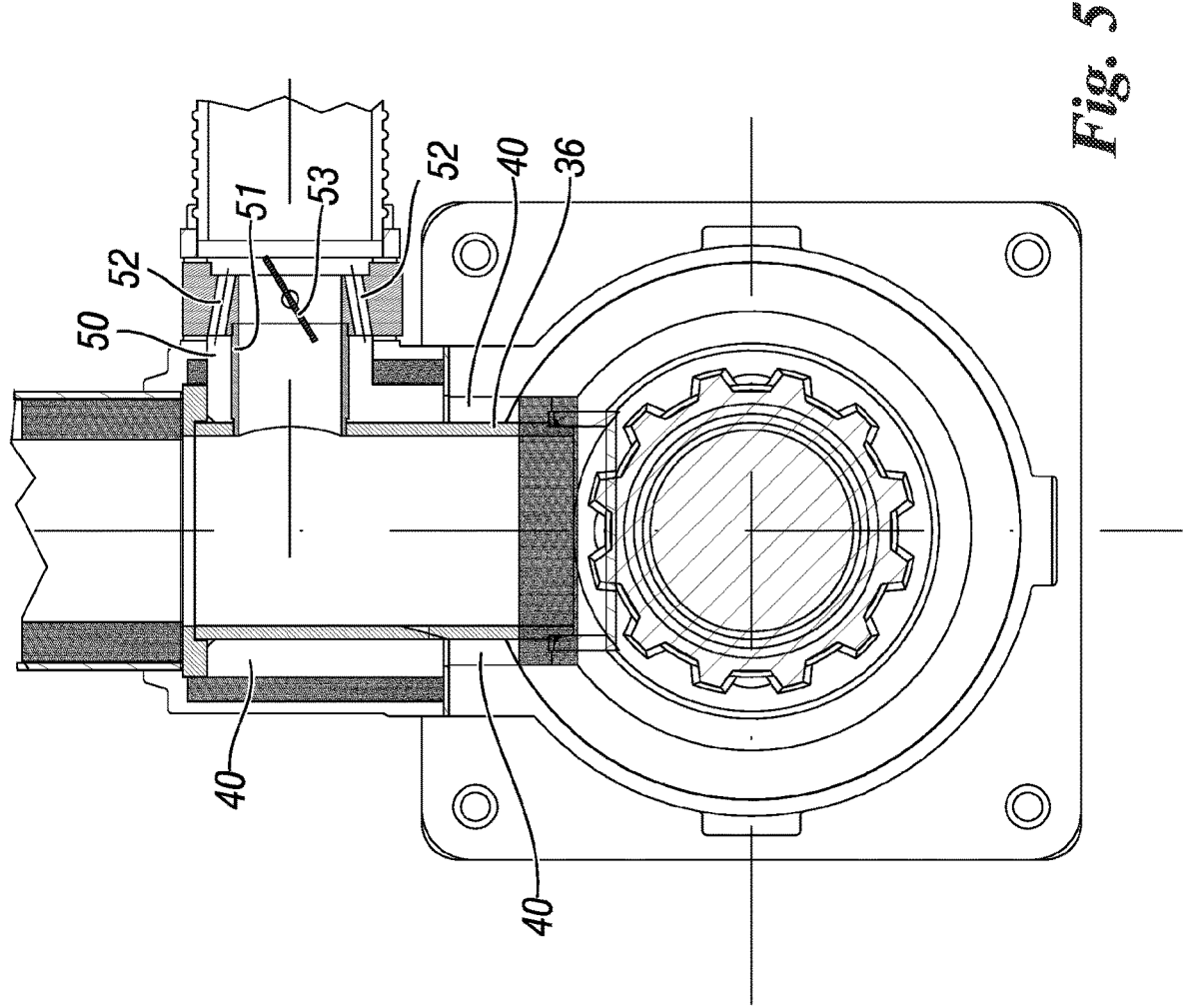

RADIANT TUBE RECUPERATIVE BURNER ASSEMBLY

TECHNICAL FIELD

The present invention relates to a radiant tube recuperative burner assembly.

BACKGROUND

Radiant tube burners are provided with a duct in which the flame develops and the flue gases circulate. They are used in apparatus in which there must be no contact between the flue gases and the material to be heated. Radiant tubes can have different shapes, including "I", "U" or "M" shaped tubes.

SUMMARY

The aim of the present invention is to provide a radiant tube recuperative burner assembly having a high heat exchange efficiency between the flue gases and the combustion air.

Another aim is to increase the heat exchange surface.

A further aim is to increase the temperature of the combustion air.

Another aim is to decrease the production of NOx.

In accordance with the present invention, these aims and others yet are achieved by a radiant tube recuperative burner assembly having a heat exchanger and a burner; said heat exchanger comprises: a first inner tube; a second heat exchanger tube coaxial and external to the first tube; a third tube coaxial and external to said second tube; a fourth tube positioned perpendicular to said first tube; a fifth tube coaxial and internal to said fourth tube; a flue gas outlet passage positioned inside said fifth tube; a first gap between said first tube and said second tube; a second gap between said third tube and said second tube; a sixth gap between said fourth tube and said fifth tube; said first gap communicates with said sixth gap; said second gap communicates with said flue gas outlet passage; a Venturi tube positioned transverse to said fifth tube; the inlet of the Venturi tube communicates with said sixth gap; said Venturi tube has an outlet that is in communication with said flue gas outlet passage; and with a connection tube between said heat exchanger and said burner.

Further features of the invention are described in the dependent claims.

This solution has various advantages with respect to solutions of the state of the art.

BRIEF DESCRIPTION OF THE DRAWINGS

The features and advantages of the present invention will be apparent from the following detailed description of a practical embodiment thereof, illustrated by way of non-limiting example in the accompanying drawings, wherein:

FIG. 4 shows a radiant tube recuperative burner assembly, in a front view, in accordance with the present invention;

FIG. 5 shows a heat exchanger of an alternative embodiment of a radiant tube recuperative burner assembly, in a front view, in accordance with the present invention.

DETAILED DESCRIPTION

Figure 1:
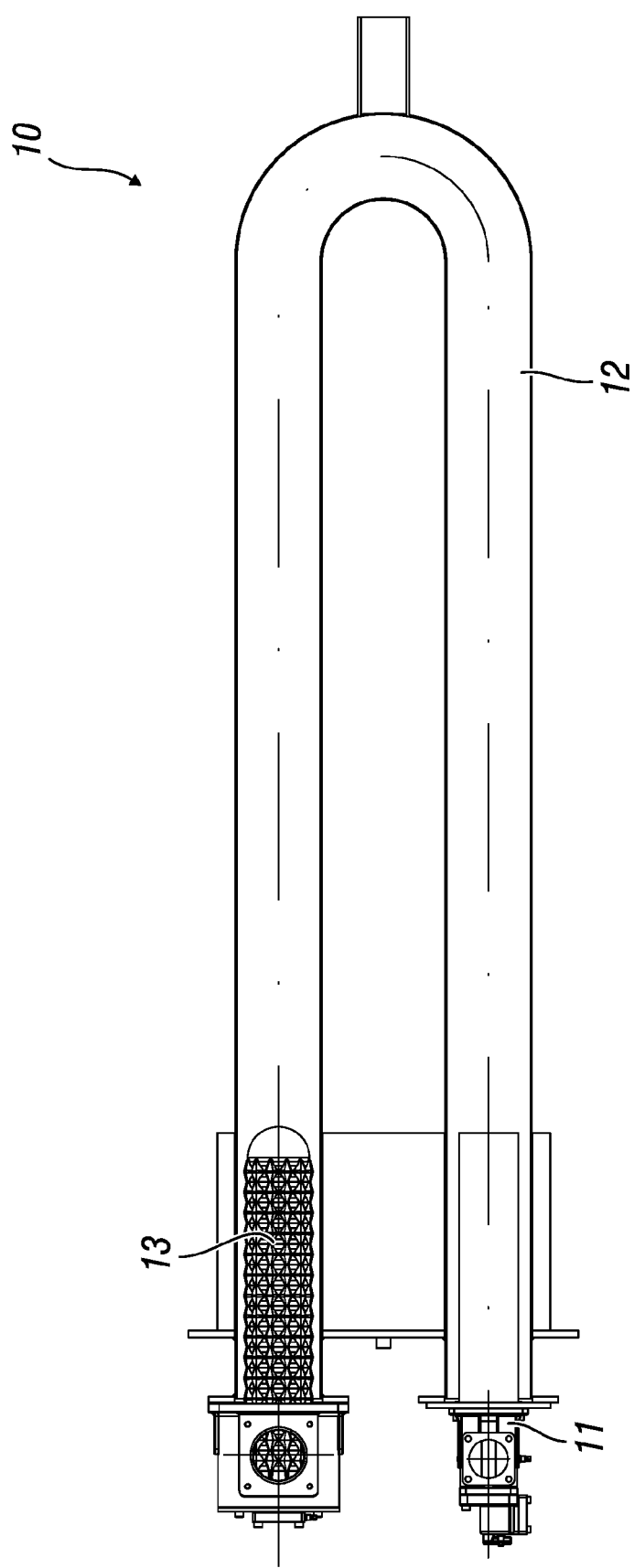
FIG. 1 shows a radiant tube recuperative burner assembly, in accordance with the present invention.
Figure 2:
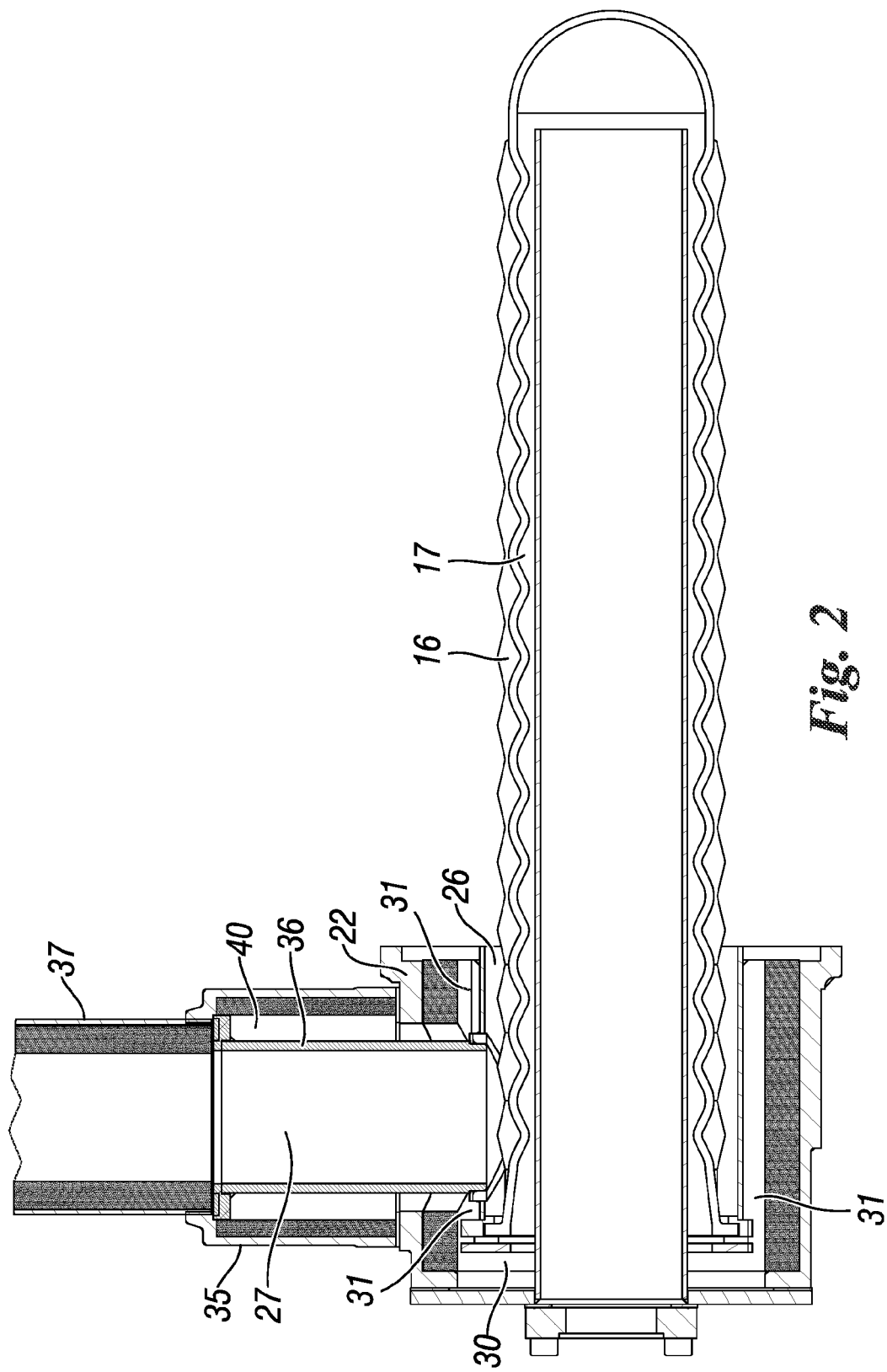
FIG. 2 shows a heat exchanger of a radiant tube recuperative burner assembly, in a sectional side view, in accordance with the present invention.
Figure 3:
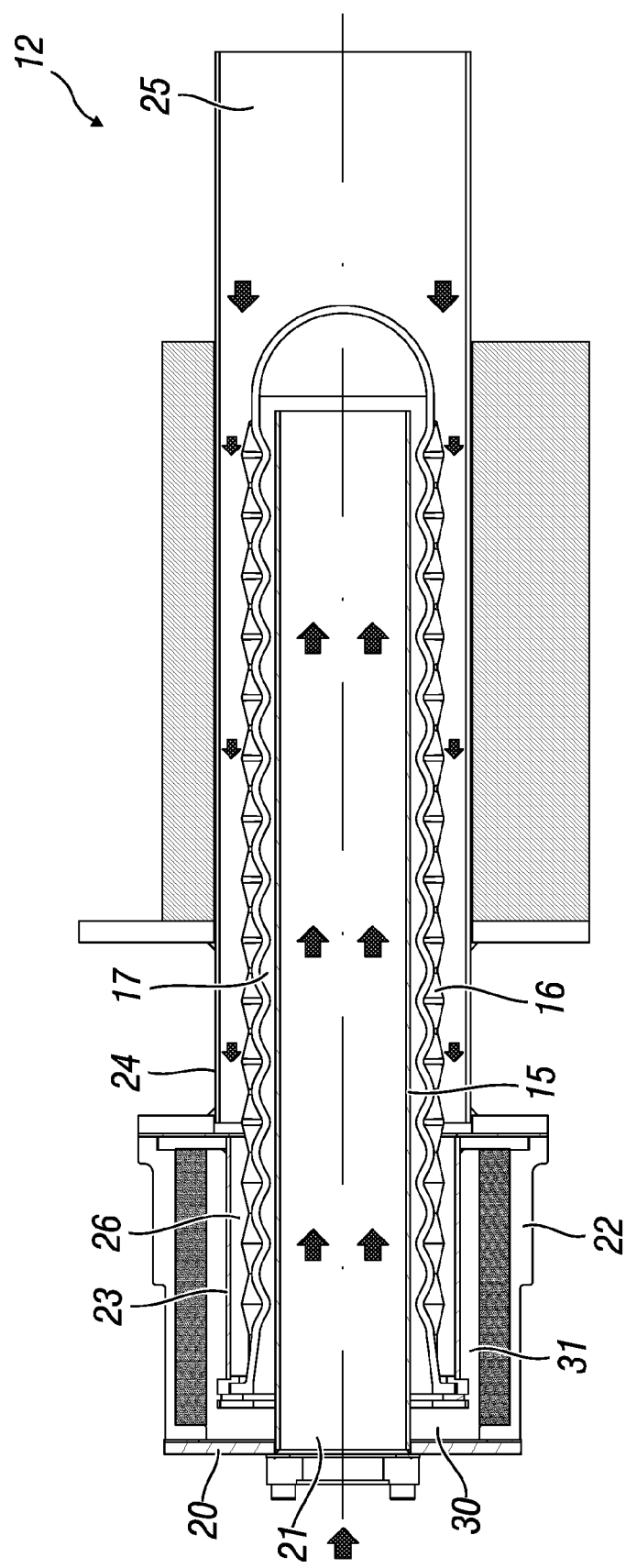
FIG. 3 shows a portion of a heat exchanger of a radiant tube recuperative burner assembly, in a sectional top view, in accordance with the present invention.

With reference to the accompanying figures, a radiant tube recuperative burner assembly 10, in accordance with the present invention, comprises a burner 11 positioned at the end of a U-shaped radiant tube 12, and a heat exchanger 13 positioned at the other end of the radiant tube 12.

The heat exchanger 12 comprises a first inner tube 15, a second heat exchanger tube 16 coaxial and external to the first tube 15. The second tube 16 has a corrugated outer surface for improved heat exchange.

A first annular and horizontal gap 17 is created between the first tube 15 and the second tube 16.

The first tube 15 is fixed, on one side, to a plate 20 having a circular shape with a central circular hole 21 which allows the (cold) combustion air to enter the first tube 15, the other end of which is open.

A first outer circular structure 22, to which the second tube 16 is fixed by means of a second inner circular structure 23 coaxial to the first circular structure 22, is fixed to the plate 20.

A third tube 24 coaxial and external to the second tube 16 is fixed to the first circular structure 22.

A second annular and horizontal gap 25 is created between the third tube 24 and the second tube 16.

The second tube 16 is located spaced with respect to the plate 20 so as to leave space for a third substantially vertical gap 30 communicating with the first gap 17.

The third gap 30, which is against the plate 20, communicates with a fourth annular and horizontal gap 31 that is created between the second circular structure 23 and the first outer circular structure 22.

The fourth gap 31 extends for the entire length of the first circular structure 22, which corresponds to approximately a quarter of the entire length of the second heat exchanger tube 16.

The third tube 24 starts at the end of the first circular structure 22 and therefore is approximately three quarters of the length of the second heat exchanger tube 16.

A fifth annular and horizontal gap 26, in communication with the second gap 25, is created between the second heat exchanger tube 16 and the second inner circular structure 23.

A fourth tube 35, positioned perpendicular to the first circular structure 22, is fixed vertically to the first outer circular structure 22.

A fifth tube 36, that supports the flue gas outlet pipe 37, is positioned internally and coaxial to the fourth tube 35.

Therefore, the fifth annular gap 26 is directly connected to the flue gas outlet passage 27 formed by the fourth tube 35 and by the pipe 37.

The fourth gap 31 is connected to a sixth annular and vertical gap 40 created between the fourth tube 35 and the fifth tube 36.

The sixth gap 40 is connected to a Venturi tube 41 positioned transverse to the fifth tube 36 that passes through it and flows into a connection pipe 42 between the flue gas outlet passage 27 and the burner 11, i.e., between the heat exchanger 13 and the burner 11.

The outlet of the Venturi tube 41 has a diameter that is smaller than the diameter of the pipe 42.

The inner elements in contact with the flue gases are made of steels able to withstand the temperature so that no protective heat insulation is required. Instead, the outer elements can be made of lighter materials less able to withstand the temperature, being in contact with the combustion air, which is still cold.

In any case, insulating material is positioned where necessary, for example outside the fourth gap 31, inside the fourth tube 35 and inside the pipe 37.

The air flowing through the hole 21 enters the first tube 15 the distal end of which is open, but as the distal end of the second heat exchanger tube 16 is closed, it passes into the first gap 17, reaches the third gap 30 and then the fourth gap 31.

From here it passes into the sixth gap 40, enters the Venturi tube 41 and mixes with the flue gases inside the pipe 42.

Instead, the flue gases reach the second gap 25 flowing in the opposite direction to the flow of the air flowing through the hole 21 and reach the fifth annular gap 26. They enter the flue gas outlet passage 27 and flow into the flue gas outlet pipe 37.

Also passing close to the Venturi tube 41, the speed of the air flowing out of it pushes part of the flue gases into the pipe 42 and mix with it.

The burner 11 is thus supplied with heated combustion air mixed with part of the flue gases.

In this way, the preheated air temperature can reach values of over 500° C. With this system, up to 40% of flue gases can be recirculated, with a system that is also stable in the cold start phase. The dimensions of the Venturi insert are linked to some parameters, including:

Maximum output of the burner

Percentage of recirculated flue gases

Combustion air pressure available to the heat exchanger.

With this system, the advantage is that of being able to reach NOx emission values of less than 150-200 mg/Nm3 with a system integrated within the heat exchanger.

The sixth annular and vertical gap 40 is connected to a seventh gap 50 that surrounds a pipe 51 for connection between the fifth tube 36 and the connection pipe 42.

In an alternative embodiment, instead of the sixth gap 40 being connected directly to the inlet of the Venturi tube 41, the seventh gap 50 communicates with a plurality of holes 52 arranged annularly to the pipe 51 and that flow into the pipe 42 coaxially to the flow of the flue gases arriving from the tube 36.

The plurality of holes 52 creates the Venturi effect as they have a smaller section with respect to the gap to which they are connected.

A valve 53 can be inserted inside the pipe 51, which allows regulation of the amount of flue gases to be recycled.

The system always recirculates the flue gases inside the pipe 42, creating a vacuum pressure at the centre which draws the flue gases, but has the advantage of being able to mount the butterfly valve 53 that allows the passage of the flue gases to be closed during heating of the heat exchanger from cold.

The cold stability is a critical part of the system that limits the percentage of recirculated flue gases.

The greater recirculation is, the more the flame becomes unstable, and therefore dedicated start-up procedures must always be followed. This lengthens the initial heating times and, in any case, produces a marked level of CO in the flue gases.

Therefore, a compromise must be found between the needs of the cold phase and the emissions to be respected.

Normally, the percentage of exhausted flue gases reaches at most 40% as the cold burner is unable to maintain a stable flame above that percentage of exhausted flue gases.

With the presence of the valve 53, it is possible to reduce or block the cold flue gases, and therefore the burner will switch on without having recirculated flue gases and therefore will be much more stable.

After reaching a given temperature, the valve 53 is opened, the amount of the recirculated flue gases can exceed the percentage of 40% and combustion is in any case stable as the system is hot.

The series of surfaces 16, 23, 36 and 41 increases the efficiency of the burner as the heat exchange with the flue gases is not limited to the surface of the heat exchanger 16 but on further metal bodies downstream.

Dilution of the combustion air with the combustion gases allows the oxygen content to be controlled in the reaction zone and therefore a reduction of the temperature of said combustion, reducing the NOx emitted.

The Venturi tube 41 allows the amount of recirculating flue gases to be increased.

The valve 53 allows their amount to be regulated.

In this way, it is possible to obtain a recirculation of the flue gases that, as a function of the pressure of available combustion air entering the heat exchanger, can reach over 50%.

The invention claimed is:

1. A radiant tube recuperative burner assembly having a heat exchanger (13) and a burner (11); said heat exchanger (13) comprises: a first inner tube (15); a second heat exchanger tube (16) coaxial and external to the first tube (15); a third tube (24) coaxial and external to said second tube (16); a fourth tube (35) positioned perpendicular to said first tube (15); a fifth tube (36) coaxial and internal to said fourth tube (35); a flue gas outlet passage (27) positioned inside said fifth tube (36); a first gap (17) between said first tube (15) and said second tube (16); a second gap (25) between said third tube (24) and said second tube (16); a sixth gap (40) between said fourth tube (35) and said fifth tube (36); said first gap (17) communicates with said sixth gap (40); said second gap (25) communicates with said flue gas outlet passage (27); a Venturi tube (41, 52) positioned transverse to said fifth tube (36); the inlet of the Venturi tube (41, 52) communicates with said sixth gap (40); said Venturi tube (41, 52) has an outlet that is in communication with said flue gas outlet passage (27); and with a connection pipe (42) between said heat exchanger (13) and said burner (11).

2. The burner assembly in accordance with claim 1, characterised by comprising a plate (20) having a circular shape with a central circular hole (21) which allows the combustion air to enter said first tube (15), and a third gap (30) against said plate (20).

3. The burner assembly in accordance with claim 2, characterised by comprising: a first outer circular structure (22) fixed to said plate (20); a second inner circular structure (23) coaxial to said first circular structure (22), said second tube (16) is fixed to said first circular structure (22); a fourth gap (31) between said second circular structure (23) and said first circular structure (22).

4. The burner assembly in accordance with claim 3, characterised in that said third tube (24) is fixed to said first circular structure (22).

5. The burner assembly in accordance with claim 3, characterised in that said fourth tube (35) is fixed perpendicular to said first outer circular structure (22).

6. The burner assembly in accordance with claim 5, characterised in that said fifth tube (36) supports a flue gas outlet pipe (37).

7. The burner assembly in accordance with claim 5, characterised in that said first gap (17) communicates with said third gap (30), with said fourth gap (31), and with said sixth gap (40).

8. The burner assembly in accordance with claim 5, characterised in that said second gap (25) communicates with said fifth gap (26) and with said flue gas outlet passage (27).

9. A heat exchanger (13) of a burner (11), where said heat exchanger (13) is connected to said burner (11) by means of a connection pipe (42), comprising: a first inner tube (15); a second heat exchanger tube (16) coaxial and external to the first tube (15); a third tube (24) coaxial and external to said second tube (16); a fourth tube (35) positioned perpendicular to said first tube (15); a fifth tube (36) coaxial and internal to said fourth tube (35); a flue gas outlet passage (27) positioned inside said fifth tube (36); a first gap (17) between said first tube (15) and said second tube (16); a second gap (25) between said third tube (24) and said second tube (16); a sixth gap (40) between said fourth tube (35) and said fifth tube (36); said first gap (17) communicates with said sixth gap (40); said second gap (25) communicates with said flue gas outlet passage (27); a Venturi tube (41, 52) positioned transverse to said fifth tube (36); the inlet of the Venturi tube (41, 52) communicates with said sixth gap (40); said Venturi tube (41, 52) has an outlet that is in communication with said flue gas outlet passage (27).

\* \* \* \* \*